United States Patent
Lee et al.

(10) Patent No.: US 11,969,626 B2
(45) Date of Patent: Apr. 30, 2024

(54) ELECTRONIC DEVICE GUIDING FALLING POINT OF BALL AND SYSTEM INCLUDING THE SAME

(71) Applicant: VC INC., Seoul (KR)

(72) Inventors: Hakyong Lee, Yongin-si (KR); Jeongho Park, Gunpo-si (KR)

(73) Assignee: VC INC., Seoul (KR)

( * ) Notice: Subject to any disclaimer, the term of this patent is extended or adjusted under 35 U.S.C. 154(b) by 273 days.

(21) Appl. No.: 17/434,470

(22) PCT Filed: Mar. 26, 2020

(86) PCT No.: PCT/KR2020/004148
§ 371 (c)(1),
(2) Date: Aug. 27, 2021

(87) PCT Pub. No.: WO2020/204469
PCT Pub. Date: Oct. 8, 2020

(65) Prior Publication Data
US 2022/0134183 A1   May 5, 2022

(30) Foreign Application Priority Data

Mar. 29, 2019 (KR) .................. 10-2019-0036949

(51) Int. Cl.
A63B 24/00   (2006.01)
A63B 102/32  (2015.01)

(52) U.S. Cl.
CPC .. *A63B 24/0021* (2013.01); *A63B 2024/0053* (2013.01); *A63B 2102/32* (2015.10); *A63B 2220/35* (2013.01); *A63B 2220/36* (2013.01)

(58) Field of Classification Search
CPC ........ A63B 24/0021; A63B 2024/0053; A63B 2102/32; A63B 2220/35; A63B 2220/36;
(Continued)

(56) References Cited

U.S. PATENT DOCUMENTS 5,489,099 A * 2/1996 Rankin .............. A63B 24/0003
                                                        473/409
6,520,864 B1 * 2/2003 Wilk .................... A63B 57/00
                                                        473/407
(Continued)

FOREIGN PATENT DOCUMENTS

JP   2004-041775   2/2004
JP   2010-035796   2/2010
(Continued)

OTHER PUBLICATIONS

KIPO, PCT Search Report & Written Opinion of Application No. PCT/KR2020/004148, dated Jul. 3, 2020.

*Primary Examiner* — Nini F Legesse
(74) *Attorney, Agent, or Firm* — LEX IP MEISTER, PLLC

(57) ABSTRACT

Provided is an electronic device including: a trajectory calculation unit measuring an initial physical quantity of a hit ball and calculating a trajectory of the ball by using the initial physical quantity; an azimuth sensor measuring a first azimuth corresponding to a direction that the trajectory calculation unit faces; and a control unit calculating a displacement of the ball by using the first azimuth and the trajectory of the ball.

12 Claims, 11 Drawing Sheets

(58) Field of Classification Search
CPC . G06T 2207/10028; G06T 2207/30224; G06T 2207/30241; G06T 7/246
See application file for complete search history.

(56) References Cited

U.S. PATENT DOCUMENTS

| | | | |
|---|---|---|---|
| 10,596,416 B2* | 3/2020 | Forsgren | G01S 13/72 |
| 2004/0032970 A1* | 2/2004 | Kiraly | A63B 24/0021 |
| | | | 382/103 |
| 2008/0182685 A1 | 7/2008 | Marty et al. | |
| 2012/0238380 A9* | 9/2012 | Marty | G06V 40/23 |
| | | | 473/407 |
| 2016/0306036 A1* | 10/2016 | Johnson | G06T 7/254 |
| 2016/0320476 A1* | 11/2016 | Johnson | G01S 13/867 |
| 2018/0133578 A1 | 5/2018 | Kiraly | |
| 2019/0282882 A1* | 9/2019 | Kim | G01C 1/00 |
| 2020/0158873 A1* | 5/2020 | Kim | G01S 17/88 |
| 2020/0282287 A1* | 9/2020 | Kim | G01C 21/20 |

FOREIGN PATENT DOCUMENTS

| | | |
|---|---|---|
| JP | 2014-023701 | 2/2014 |
| JP | 2015-150061 | 8/2015 |
| JP | 2018-033819 | 3/2018 |
| KR | 10-2013-0000799 | 1/2013 |
| KR | 10-2018-0121834 | 11/2018 |
| WO | 2017-057157 | 4/2017 |
| WO | 2018-093415 | 5/2018 |
| WO | WO-2018194362 A1 * 10/2018 | ............. A63B 69/36 |

* cited by examiner

ELECTRONIC DEVICE GUIDING FALLING POINT OF BALL AND SYSTEM INCLUDING THE SAME

TECHNICAL FIELD

The present disclosure relates to an electronic device guiding a fall point of a ball and a system including the same.

BACKGROUND ART

Golf is a sport in which a golfer hits a golf ball and puts the golf ball into a hole.

The golfer may determine a target point in consideration of a current position of the golf ball and a position of the hole, select an appropriate golf club and hit the golf ball for the golf ball to be moved to the target point.

After hitting the golf ball, it is difficult for the golfer to visually check the golf ball because the golf ball is moved at a high speed. That is, there is a problem that it is difficult for the golfer to check a falling point of the golf ball.

In addition, it is difficult to check a trajectory of the golf ball hit by the golfer, and accordingly, there is a problem that it is difficult to check an actual quality (fade, draw and the like) of the golf ball hit by the golfer.

DISCLOSURE

Technical Problem

An exemplary embodiment of the present disclosure provides an electronic device guiding a falling point of a hit ball and a system including the same.

Another exemplary embodiment of the present disclosure provides an electronic device guiding a trajectory of a hit ball and a system including the same.

Yet another exemplary embodiment of the present disclosure provides a portable electronic device and a system including the same.

Technical Solution

According to a first exemplary embodiment of the present disclosure, an electronic device includes: a trajectory calculation unit measuring an initial physical quantity of a hit ball and calculating a trajectory of the ball by using the initial physical quantity; an azimuth sensor measuring a first azimuth corresponding to a direction that the trajectory calculation unit faces; and a control unit calculating a displacement of the ball by using the first azimuth and the trajectory of the ball.

The electronic device may further include: a memory storing information on a golf course map; and a position acquisition sensor acquiring a current position of the electronic device, wherein the control unit calculates a falling point of the ball in a golf course, corresponding to the current position, by using the map information, the current position, and the displacement of the ball.

The electronic device may further include a communication unit, wherein the control unit controls information on the falling point to an external electronic device to be transmitted by the communication unit for an indicator indicating the falling point on the golf course map to be displayed on a display unit of the external electronic device.

The electronic device may further include a display unit, wherein the control unit controls an indicator indicating the falling point on the golf course map to be displayed on the display unit.

The trajectory calculation unit may include a Doppler radar sensor measuring the velocity and spin of the ball.

The trajectory calculation unit may include a camera calculating the velocity and spin of the ball by using successively captured image frames.

According to a second exemplary embodiment of the present disclosure, an electronic device includes: a communication unit; a hit ball measurement unit measuring an initial physical quantity of a hit ball; an azimuth sensor measuring a first azimuth corresponding to a direction that the hit ball measurement unit faces; and a control unit controlling information on the initial physical quantity of the hit ball and the first azimuth to be transmitted to an external electronic device by the communication unit for the external electronic device to calculate a trajectory of the ball by using the initial physical quantity, to calculate a displacement of the ball by using the first azimuth and the trajectory of the ball, and to calculate a falling point of the ball in a golf course, corresponding to a current position of the external electronic device, by using information on a golf course map, the current position, and the displacement of the ball.

The hit ball measurement unit may include a Doppler radar sensor measuring the velocity and spin of the ball.

The hit ball measurement unit may include a camera calculating the velocity and spin of the ball by using successively captured image frames.

According to a third exemplary embodiment of the present disclosure, an electronic device includes: a communication unit; a trajectory calculation unit measuring an initial physical quantity of a hit ball and calculating a trajectory of the ball by using the initial physical quantity; an azimuth sensor measuring a first azimuth corresponding to a direction that the trajectory calculation unit faces; and a control unit controlling information on the first azimuth and the trajectory of the ball to be transmitted to an external electronic device by the communication unit for the external electronic device to calculate a displacement of the ball by using the first azimuth and the trajectory of the ball, and to calculate a falling point of the ball in a golf course, corresponding to a current position of the external electronic device, by using information on a golf course map, the current position, and the displacement of the ball.

The trajectory calculation unit may include a Doppler radar sensor measuring the velocity and spin of the ball.

The trajectory calculation unit may include a camera calculating the velocity and spin of the ball by using successively captured image frames.

According to a fourth exemplary embodiment of the present disclosure, an electronic device includes: a trajectory measurement unit measuring a trajectory of a hit ball; an azimuth sensor measuring a first azimuth corresponding to a direction that the trajectory calculation unit faces; and a control unit calculating a displacement of the ball by using the first azimuth and the trajectory of the ball.

The trajectory calculation unit may include a multi-radar sensor or a time-of-flight (TOF) camera.

According to a fifth exemplary embodiment of the present disclosure, an electronic device includes: a communication unit; a trajectory measurement unit measuring a trajectory of a hit ball; an azimuth sensor measuring a first azimuth corresponding to a direction that the trajectory calculation unit faces; an a control unit controlling information on the first azimuth and the trajectory of the ball to be transmitted to an external electronic device by the communication unit for the external electronic device to calculate a displacement of the ball by using the first azimuth and the trajectory of the ball, and to calculate a falling point of the ball in a golf course, corresponding to a current position of the external electronic device, by using information on a golf course map, the current position, and the displacement of the ball.

The trajectory calculation unit may include a multi-radar sensor or a time-of-flight (TOF) camera.

According to an exemplary embodiment of the present disclosure, a system includes: the electronic device of any one of the first to fifth exemplary embodiments; and a wearable electronic device displaying an indicator indicating a falling point of a hit ball on a golf course map on a display unit by receiving information on the falling point of the ball, transmitted from the electronic device, an initial physical quantity of the hit ball and a first azimuth, or the first azimuth and a trajectory of the ball.

Advantageous Effects

The electronic device according to the present disclosure and the system including the same may provide the following effects.

At least one of the exemplary embodiments of the present disclosure may provide the golfer with more accurate information on the falling point of the golf ball.

At least one of the exemplary embodiments of the present disclosure may provide the golfer with more accurate information on the movement trajectory of the golf ball.

At least one of the exemplary embodiments of the present disclosure may provide the device guiding a falling point of a golf ball that is convenient for the golfer to carry.

Additional applicable scope of the present disclosure may become apparent from the detailed description below. However, various changes and modifications within the scope of the present disclosure may be clearly understood by those skilled in the art. Therefore, it should be understood that the specific exemplary embodiments of the present disclosure such as the preferred exemplary embodiments described in the detailed description are only given by way of examples.

MODE FOR INVENTION

Figure 1:
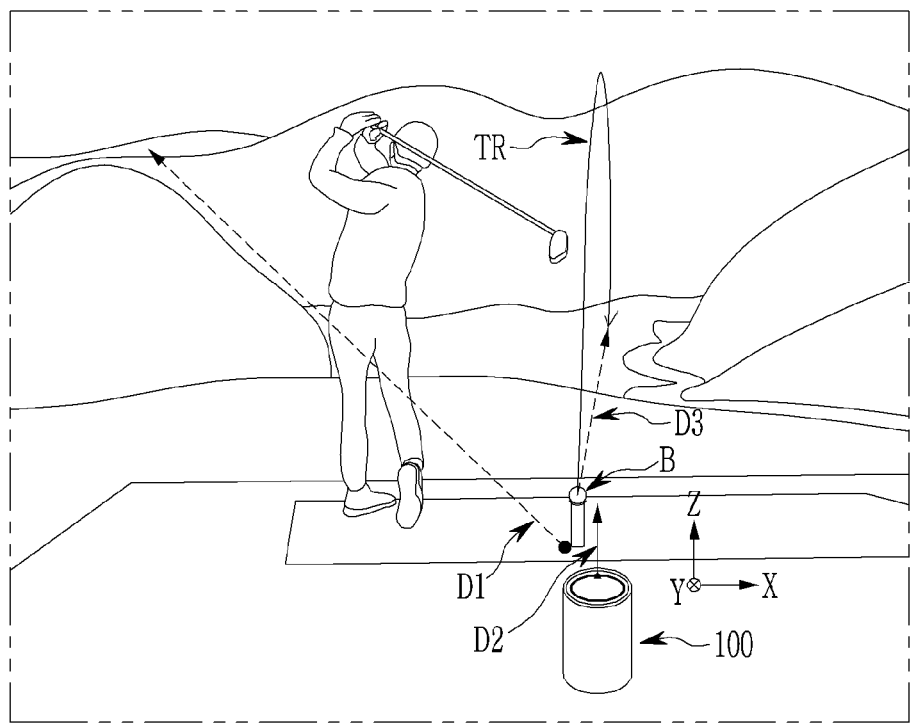
FIG. 1 is an exemplary diagram for explaining a situation in which an electronic device guiding a falling point of a ball is used according to an exemplary embodiment.

Hereinafter, various exemplary embodiments of the present disclosure are described with reference to the accompanying drawings. However, it is to be understood that technology mentioned in the present disclosure is not limited to specific exemplary embodiments, and includes all modifications, equivalents and/or substitutions according to the exemplary embodiments of the present disclosure. Throughout the accompanying drawings, similar components may be denoted by similar reference numerals.

In the present disclosure, an expression 'have', 'may have', 'include', 'may include' or the like, indicates existence of a corresponding feature (for example, numerical value, function, operation, component such as a part or the like), and does not exclude existence of an additional feature.

In the present disclosure, an expression "A or B," "least one of A and/or B" or "one or more of A and/or B" or the like, may include all possible combinations of items enumerated together. For example, "A or B," "at least one of A and B," or "at least one of A or B" may indicate all of 1) a case in which at least one A is included, 2) a case in which at least one B is included, or 3) a case in which both of at least one A and at least one B are included.

Expressions 'first', 'second' or the like, used in the present disclosure may indicate various components regardless of a sequence and/or importance of the components. These expressions are used only in order to distinguish one component from the other components, and do not limit the corresponding components. For example, a first user device and a second user device may indicate different user devices, regardless of a sequence or importance thereof. For example, a 'first' component may be named a 'second' component and the 'second' component may also be similarly named the 'first' component, without departing from the scope of the present disclosure.

In case that any component (for example, a first component) is mentioned to be (operatively or communicatively) coupled with/to or connected to another component (for example, a second component), it is to be understood that the any component is directly coupled to the another component or may be coupled to the another component through other component (for example, a third component). On the other hand, if it is mentioned that any component (for example, a first component) is "directly coupled" or "directly connected" to another component (for example, a second component), it is to be understood that the other component (for example, a third component) is not present between the any component and the another component.

An expression "configured (or set) to" used in the present disclosure may be replaced by an expression "suitable for," "having the capacity to," "designed to," "adapted to," "made to" or "capable of" based on a situation. A term "configured (or set) to" may not necessarily mean "specifically designed to" in hardware. Instead, an expression "an apparatus configured to" may mean that the apparatus may "perform-" together with other apparatuses or components. For example, a phrase "a processor configured (or set) to perform A, B and C" may mean a dedicated processor (for example, embedded processor) for performing the corresponding operations or a generic-purpose processor (for example, central processing unit (CPU) or application processor) that may perform the corresponding operations by executing one or more software programs stored in a memory apparatus.

Terms used in the present disclosure are used only to describe the specific embodiments rather than limiting the scope of another exemplary embodiment. Singular forms used herein are intended to include plural forms unless explicitly indicated otherwise. Terms used in the present specification including technical and scientific terms have the same meanings as those that are generally understood by those skilled in the art to which the present disclosure pertains. Terms generally used and defined in a dictionary among terms used in the present disclosure are to be interpreted as having meanings that are the same as or similar to meanings within a context of the related art, and are not to be interpreted as having ideal or excessively formal meanings unless clearly indicated in the present specification. In some cases, terms may not be interpreted to exclude the exemplary embodiments of the present disclosure even though they are defined in the present disclosure.

An electronic device according to the various exemplary embodiments of the present disclosure may include, for example, at least one of a smartphone, a tablet personal computer (PC), a mobile phone, a video phone, an e-book reader a laptop personal computer (PC), a netbook computer, a mobile medical device, a camera or a wearable device. According to the various exemplary embodiments, the wearable device may include at least one of: an accessory type wearable device (for example, watch, ring, bracelet, anklet, necklace, glasses, contact lens, or head-mounted-device (HMD)); a textile or clothing integral type wearable device (for example, electronic clothing); a body attachment type wearable device (for example, skin pad or tattoo); and a living body implantation type wearable device (for example, implantable circuit).

FIG. 1 is an exemplary diagram for explaining a situation in which an electronic device guiding a falling point of a ball is used according to an exemplary embodiment.

As shown in the drawing, a golfer may dispose an electronic device 100 guiding a falling point of a golf ball, at a start point of a golf course, i.e., a teeing ground (or a tee box). The electronic device 100 may be positioned in a direction opposite to a direction in which the golf ball B is scheduled to travel by the hit. That is, the electronic device 100 may be positioned behind the golf ball B.

When the golfer hits the golf ball B to move the golf ball B to a green positioned in a first direction D1, the electronic device 100 may measure an initial physical quantity (e.g., velocity and spin of the hit golf ball B, and distance between the golf ball B and the electronic device 100). The initial physical quantity may be directly measured by a radar unit described below, or may be calculated using an image captured by a camera.

The electronic device 100 may calculate a trajectory TR of the golf ball B using the initial physical quantity. In addition, the electronic device 100 may measure the trajectory TR of the hit golf ball B itself.

The electronic device 100 may measure an azimuth of a direction D2 that the electronic device 100 faces. The direction D2 that the electronic device 100 faces may be a direction in which the electronic device 100 is disposed to measure the initial physical quantity of the golf ball B. For example, the direction D2 that the electronic device 100 faces may be a direction that the radar unit or camera faces.

The electronic device 100 may calculate the falling point of the golf ball B using the azimuth D2 from a point where the electronic device 100 is positioned to a point where the golf ball B is positioned, the distance between the golf ball B and the electronic device 100, and the trajectory TR of the golf ball B. Here, the falling point may be determined as a point where a Z value of the trajectory TR of the golf ball B is zero. Alternatively, the electronic device 100 may further use information on a corresponding golf course map to determine a point where an altitude of a position expected as the falling point of the golf ball B and the Z value of the trajectory TR are the same as the falling point.

The electronic device 100 may calculate a (relative) displacement D3 from a position of the golf ball B before the hit to the falling point of the golf ball B by using the falling point of the golf ball B.

The electronic device 100 may acquire coordinates of the point where the electronic device 100 is positioned. The electronic device 100 may calculate the falling point of the golf ball B on the information on the corresponding golf course map in consideration of the acquired current position of the electronic device 100 and the displacement D3. The electronic device 100 may display the falling point of the golf ball B on the map information.

The electronic device 100 may display the determined falling point of the golf ball B on the information on the corresponding golf course map, and may also display the trajectory of the golf ball B between the point where the electronic device 100 is positioned and the falling point of the ball.

The electronic device 100 may transmit information on the initial physical quantity of the hit golf ball B, the azimuth D2, and the distance between the golf ball B and the electronic device 100 to an external electronic device (smartphone, wearable electronic device, distance measurement device or the like) which may acquire its current position. The external electronic device may then calculate the trajectory TR of the golf ball B by using the initial physical quantity, may calculate the falling point of the golf ball B by using the azimuth D2, the distance between the golf ball B and the electronic device 100 and the trajectory TR of the golf ball B, and may then calculate the displacement D3 of the golf ball B to the falling point. The external electronic device may acquire the current position of the external electronic device, and calculate the falling point of the golf ball B on the information on the corresponding golf course map in consideration of the current position and the displacement D3. The external electronic device may display the falling point of the golf ball B on the map information.

The electronic device 100 may also transmit information on the azimuth D2, the distance between the golf ball B and the electronic device 100, and the trajectory TR of the golf ball B to the external electronic device which may acquire the current position. The external electronic device may then calculate the falling point of the golf ball B using the azimuth D2, the distance between the golf ball B and the electronic device 100 and the trajectory TR of golf ball B, and may then calculate the displacement D3 of the golf ball B to the falling point. The external electronic device may acquire the current position of the external electronic device, and calculate the falling point of the golf ball B on the information on the corresponding golf course map in consideration of the current position and the displacement D3. The external electronic device may display the falling point of the golf ball B on the map information.

The electronic device 100 may also transmit information on the displacement D3 to an external electronic device which may acquire its current position. The external electronic device may then acquire the current position of the external electronic device, and calculate the falling point of the golf ball B on the information on the corresponding golf course map in consideration of the current position and the displacement D3. The external electronic device may display the falling point of the golf ball B on the map information.

The electronic device 100 may also transmit information on the calculated falling point of the golf ball B to the external electronic device which may acquire its current position. The external electronic device may display the falling point of the golf ball B on the map information.

Meanwhile, the electronic device 100 may capture images of the golfer and the golf ball B for a predetermined time before and after a moment when the golf ball B is hit.

Hereinafter, the description describes the electronic device guiding a falling point of a ball in detail with reference to FIGS. 2 to 7.

Figure 2:
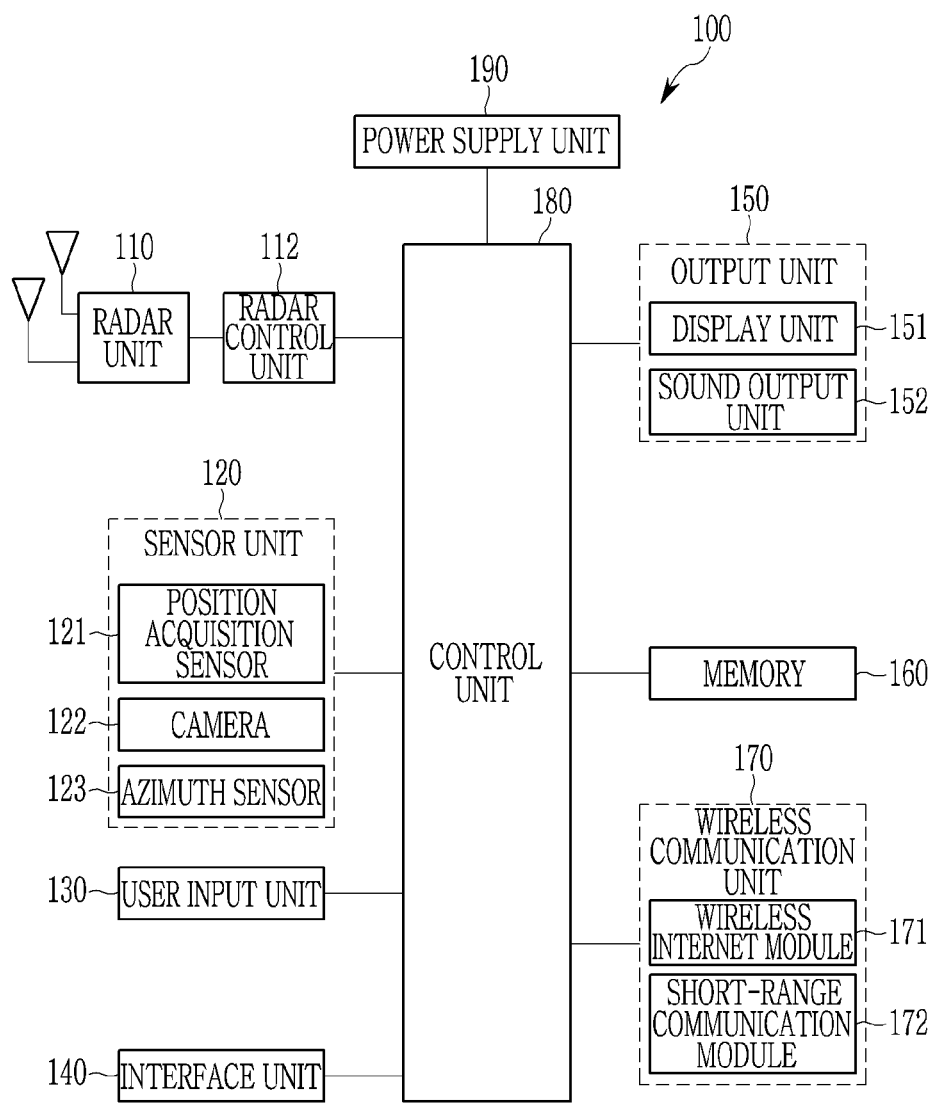
FIG. 2 is a block diagram for explaining the electronic device guiding a falling point of a ball according to an exemplary embodiment.

FIG. 2 is a block diagram for explaining the electronic device guiding a falling point of a ball according to an exemplary embodiment.

The electronic device 100 guiding a falling point of a ball may include a radar unit 110, a radar control unit 112, a camera 122, a user input unit 130, an interface unit 140, an output unit 150, a memory 160, a wireless communication unit 170, a control unit 180, a power supply unit 190, etc. The components shown in FIG. 1 may not be essential in implementing the electronic device 100 guiding a falling point of a ball, and the electronic device 100 guiding a falling point of a ball described in the specification may include more or fewer components than the components listed above.

In more detail, the radar unit 110 among the components may include a signal source and a plurality of antennas. The radar unit 110 may include at least one Doppler radar sensor. The plurality of antennas may be spaced apart from each other in the vertical direction, and may receive a signal when the signal emitted from the signal source is reflected from an object. The radar unit 110 may measure the initial physical quantity of an object in front thereof (hereinafter, the object is described as the golf ball, is not limited thereto, and may include a golf club) by using the signal received from the plurality of antennas.

For example, the radar unit 110 may emit a transmitted wave to the golf ball and detect a reflected wave from the golf ball. The radar unit 110 may detect launch of the hit golf ball, measure the velocity and spin of the hit golf ball and the distance between the golf ball B and the electronic device 100, and may calculate the trajectory, direction, estimated driving distance and the like of the hit golf ball.

The radar control unit 112 may control a measurement operation of the radar unit 110. In addition, the radar control unit 112 may calculate the trajectory of the golf ball by using the initial physical quantity, or calculate a swing speed of the golf club, etc.

In addition, the radar unit 110 and the radar control unit 112 may be implemented as a multi-radar sensor which may measure the trajectory of the hit golf ball itself.

A sensor unit 120 may include at least one sensor detecting at least one of information on an environment surrounding the electronic device 100 guiding a falling point of a ball and information in the electronic device 100 guiding a falling point of a ball. For example, the sensor unit 120 may include at least one of a position acquisition sensor 121, the camera 122, an azimuth sensor 123, a gyroscope sensor, a battery gauge and an environmental sensor (e.g., barometer, hygrometer or temperature gauge). Meanwhile, the electronic device 100 guiding a falling point of a ball disclosed in the specification may combine the information detected by at least two of these sensors to each other and utilize the combined information.

The position acquisition sensor 121 may be a sensor acquiring the position of the electronic device 100 guiding a falling point of a ball, and its representative example is a global positioning system (GPS) sensor. The GPS sensor may calculate the distance information and accurate time information from three (3) or more satellites and then apply trigonometry to the calculated information, thereby accurately calculating information on a three dimensional (3D) current position based on the latitude, longitude and altitude. In current days, widely used is a method in which the position and time information of the device are calculated using three satellites and an error in the calculated position and time information is then corrected using another satellite. In addition, the GPS sensor may calculate speed information of the device by continuously calculating its current position in real time.

The camera 122 may process an image frame such as a still image or a moving image, obtained by an image sensor in its capturing mode. The processed image frame may be displayed on a display unit 151 or stored in the memory 160.

The camera 122 may calculate the initial physical quantity of the golf ball by using successively captured image frames. For example, the camera 122 may calculate the velocity of the golf ball by using each position at which the golf ball is moved in the two image frames, and calculate the spin of the golf ball by detecting a degree to which a surface of the golf ball is rotated. In addition, the camera 122 may identify the golf ball and measure the distance between the golf ball and the electronic device 100.

In addition, the camera 122 may be implemented as a 3D depth camera such as a stereo type camera or a time-of-flight (TOF) camera, and may thus measure the trajectory of the golf ball itself.

The azimuth sensor 123 may be a sensor measuring the azimuth, and may acquire a value of the azimuth that the electronic device 100 guiding a falling point of a golf ball faces. The azimuth sensor 123 may be a geomagnetic sensor detecting the earth's magnetic field and measuring the azimuth. In addition, the azimuth sensor 123 may calculate the azimuth or the like by using a rotation angle in the left and right directions from a predetermined reference direction, acquired by a gyro sensor.

Next, the user input unit 130 may be a unit receiving information from a user, and when the information is input by the user input unit 130, the control unit 180 may control an operation of the electronic device 100 guiding a falling point of a ball to correspond to the input information. The user input unit 130 may include a mechanical input means (or mechanical key, e.g., button positioned on the front, back or side of the electronic device 100 guiding a falling point of a ball, or the bezel, crown, dome switch, jog wheel, jog switch or the like of the electronic device 100 guiding a falling point of a ball) land a touch input means. For example, the touch input means may be a virtual key, a soft key or a visual key, displayed on a touch screen by software processing, or a touch key disposed on a portion other than the touch screen. Meanwhile, the virtual key or the visual key may have various shapes and may be displayed on the touch screen, and for example, may be a graphic, a text, an icon, a video or a combination thereof.

The interface unit 140 may serve as a passage to various types of external devices connected to the electronic device 100 guiding a falling point of a ball. The interface unit 140 may include at least one of an external charger port, a wired/wireless data port and a memory card port. The electronic device 100 guiding a falling point of a ball may perform an appropriate control related to the connected external device, corresponding to the external device connected to the interface unit 140.

The output unit 150 may be a unit generating an output related to visual, auditory or tactile sense, and may include the display unit 151, a sound output unit 152, etc.

The display unit 151 may display (output) information processed by the electronic device 100 guiding a falling point of a ball. For example, the display unit 151 may display information on a execution screen of an application program driven by the electronic device 100 guiding a falling point of a ball, or user interface (UI) information or graphic user interface (GUI) information based on the information on the execution screen. The two or more display units 151 may be implemented based on an implementation type of the electronic device 100 guiding a falling point of a ball.

The display unit 151 may include at least one of a liquid crystal display (LCD), a thin film transistor-liquid crystal display (TFT LCD), an organic light-emitting diode (OLED) and an electronic ink display (e-ink display).

The sound output unit 152 may output audio data stored in the memory 160 as sound, and may be implemented in the form of a loudspeaker outputting various alarm sounds or multimedia playback sounds.

In addition, the output unit 150 may further include a light output unit outputting a signal notifying an occurrence of an event by using light as a light source.

In addition, the memory 160 may store data supporting various functions of the electronic device 100 guiding a falling point of a ball (e.g., data may include information on a course map of the tee box, fairway, hazard, bunker, rough, green and hole of the golf course, information on a user swing speed, the launch angle, launch speed and the like of the ball, and the data is not limited thereto). The memory 160 may store firmware and application program d riven by the electronic device 100 guiding a falling point of a ball and data and instruction words for the operation of the electronic device 100 guiding a falling point of a ball. At least some of these applications may be included in the electronic device 100 guiding a falling point of a ball from time of shipment for operating a basic function of the electronic device 100 guiding a falling point of a ball. In addition, at least some of these application programs may be downloaded from an external server through a wireless communication. Meanwhile, the application program may be stored in the memory 160, installed in the electronic device 100 guiding a falling point of a ball, and may be driven to perform the operation (or function) of the electronic device 100 guiding a falling point of a ball by the control unit 180.

The wireless communication unit 170 may include at least one module enabling a wireless communication between the electronic device 100 and a wireless communication system, between the electronic device 100 and other external wireless communication enabled devices, or between the electronic device 100 and the external server.

The wireless communication unit 170 may include a wireless internet module 171, a short-range communication module 172, etc.

The wireless internet module 171 may be a module for wireless internet access, and may be embedded in the electronic device 100 guiding a falling point of a ball. The wireless internet module 171 may transmit and receive a wireless signal in a communication network based on wireless internet technology. The wireless internet technology may be, for example, wireless local area network (WLAN), wireless-fidelity (Wi-Fi), Wi-Fi direct, a digital living network alliance (DLNA), wireless broadband (WiBro), world Interoperability for microwave access (WiMAX), high speed downlink packet access (HSDPA), high speed uplink packet access (HSUPA), long term evolution (LTE), long term evolution-advanced (LTE-A), etc. The wireless internet module 171 may transmit and receive the data based on at least one wireless internet technology in its range even including internet technology not listed above.

The short-range communication module 172 may be a module for short range communication, and may support the short range communication by using at least one of technologies of bluetooth, radio frequency identification (RFID), infrared data association (IrDA), ultra wideband (UWB), zigbee, near field communication (NFC), wireless-fidelity (Wi-Fi), Wi-Fi direct and wireless universal serial bus (USB). The short-range communication module 172 may support the wire less communication between the electronic device 100 guiding a falling point of a ball and the wireless communication system, between the electronic device 100 guiding a falling point of a ball and a wireless communication enabled device, or between the electronic device 100 guiding a falling point of a ball and a network where the external server is positioned, through the wireless local area network. The wireless local area network may be a wireless personal area network.

Here, the wireless communication enabled device may be a mobile terminal capable of exchanging (or interworking) data with the electronic device 100 guiding a falling point of a ball according to the present disclosure (for example, smartphone, tablet personal computer (PC), mobile phone, video phone, e-book reader, laptop personal computer (PC), netbook computer, mobile medical device, camera or wearable device). The short-range communication module 172 may detect (or identify) the wireless communication enabled electronic device which may communicate with the electronic device 100 in the vicinity of the electronic device 100. Further, the control unit 180 may control at least some of data processed by the electronic device 100 to be transmitted to the wireless communication enabled electronic device through the short-range communication module 172 when the detected wireless communication enabled electronic device is an electronic device authenticated to communicate with the electronic device 100 according to an exemplary embodiment. Accordingly, a user of the wireless communication enabled device may use the data processed by the electronic device 100 through the wireless communication enabled electronic device.

In addition to the operation related to the application program, the control unit 180 may control overall operations of the electronic device 100 guiding a falling point of a ball in general. The control unit 180 may provide or process appropriate information or function to the user by processing the signal, data, information or the like input or output through the component described above or by driving the application program stored in the memory 160.

In addition, the control unit 180 may control at least some of the components described with reference to FIG. 2 to drive the application program stored in the memory 160. Further, the control unit 180 may combine at least two of the components included in the electronic device 100 to each other and operate these combined components to drive the application program.

The power supply unit 190 may supply power to the respective components included in the electronic device 100 by receiving external power and internal power, under a control of the control unit 180. The power supply unit 190 may include a battery, and the battery may be a built-in battery or a replaceable battery.

At least some of the respective components may be operated in cooperation with each other to implement the operation, control or control method of the electronic device 100 according to the various exemplary embodiments described below. In addition, the operation, control or control method of the electronic device 100 may be implemented in the electronic device 100 by driving at least one application program stored in the memory 160.

Figure 3:
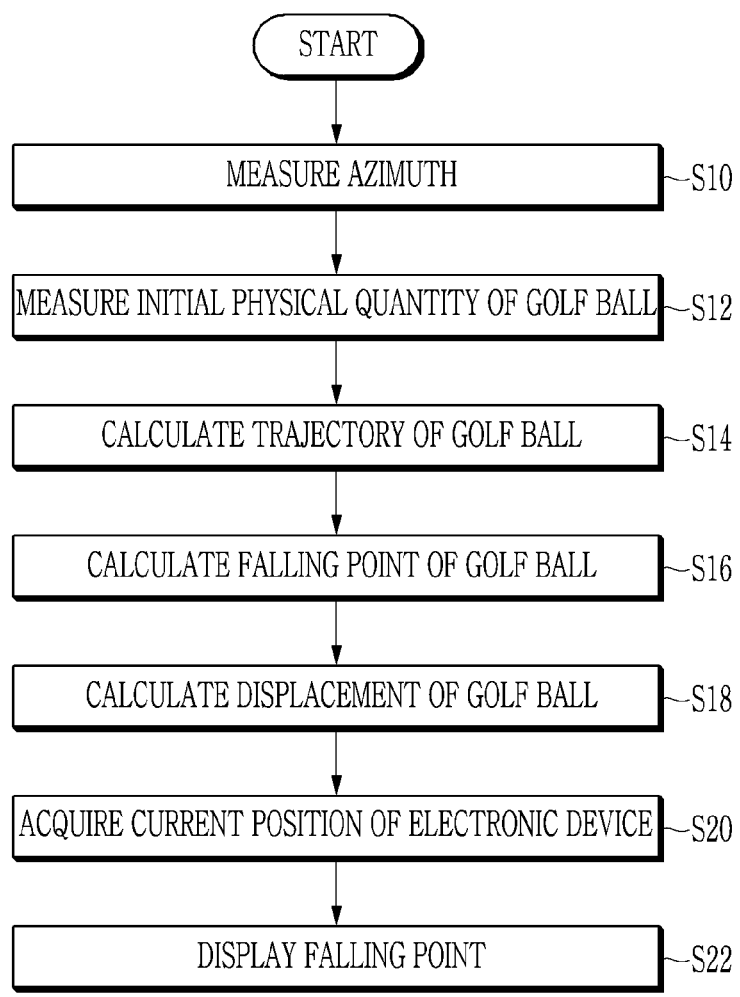
FIG. 3 is a flowchart showing a method for calculating the falling point by the electronic device according to an exemplary embodiment.
Figure 4:
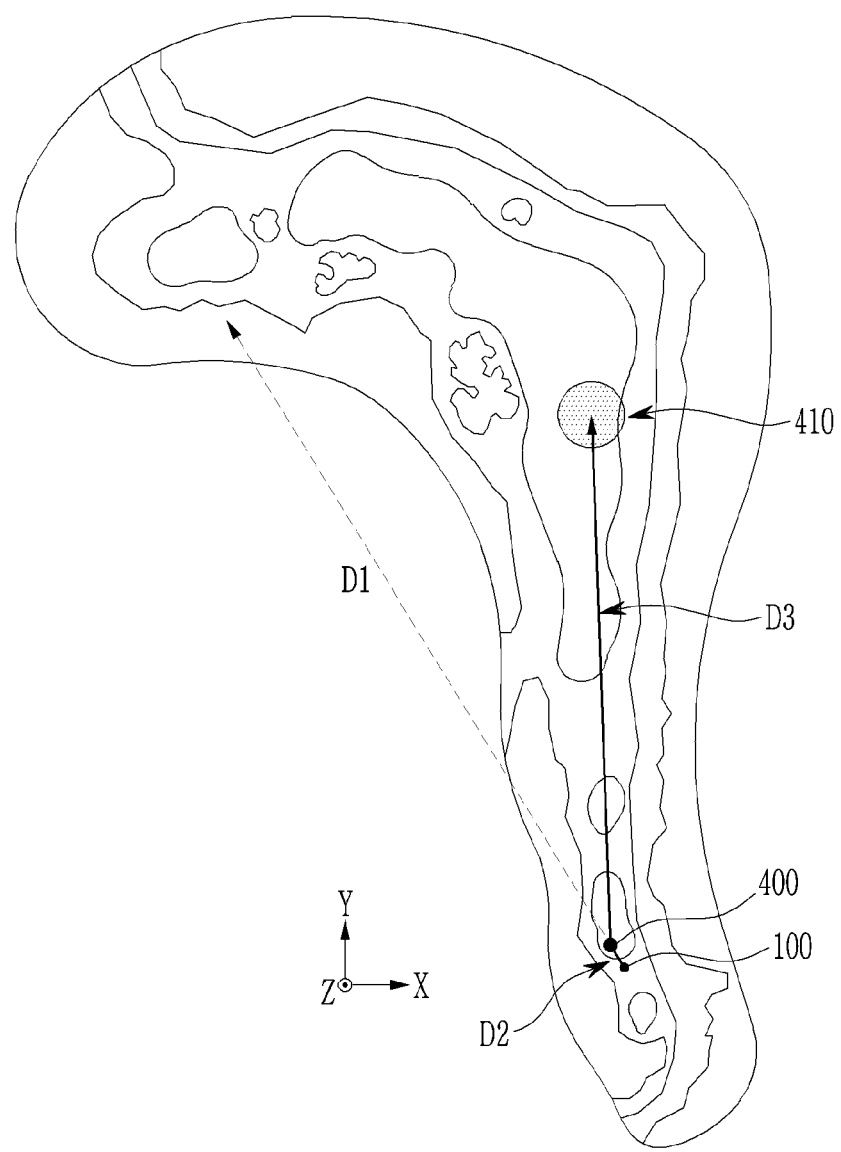
FIG. 4 is a view showing each position in a golf course.

Referring to FIGS. 3 and 4, the description describes a method of measuring the launch angle of the electronic device 100 guiding the falling point of the ball.

FIG. 3 is a flowchart showing a method for calculating the falling point by the electronic device according to an exemplary embodiment: and FIG. 4 is a view showing each position on a golf course.

Referring to FIGS. 3 and 4, the azimuth sensor 120 may measure the azimuth of the direction D2 that the electronic device 100 faces (S10).

When the golfer hits the golf ball to move the golf ball to the green positioned in the first direction D1, the radar unit 110 may measure the initial physical quantity of the hit golf ball (S12).

The radar control unit 120 may calculate the trajectory of the golf ball by using the velocity and spin of the golf ball (S14). In addition, the trajectory of the golf ball may be calculated by measuring the initial physical quantity of the golf ball by using the camera 122. In addition, the trajectory of the golf ball may be measured by the multi-radar sensor and the 3D depth camera.

The control unit 180 may calculate a falling point 410 of the golf ball by using the azimuth D2, a distance between an initial position 400 of the golf ball and the electronic device 100, and the trajectory of the golf ball (S16). Here, when the distance between the initial position 400 of the golf ball and the electronic device 100 is 5 m or less, the falling point 410 of the golf ball may be calculated by setting the position of the electronic device 100 to the initial position 400 of the golf ball.

The control unit 180 may calculate the relative displacement D3 from the position 400 of the golf ball before the hit to the falling point 410 by using the falling point 410 (S18).

The position acquisition sensor 121 may acquire the coordinates of the electronic device 100 (S20). The control unit 180 may calculate the falling point of the golf ball in the golf course corresponding to the current position in consideration of the map information, the current position and the displacement D3, and may display the falling point of the golf ball on the map information (S22). The description describes this operation with reference to FIG. 5.

Figure 5:
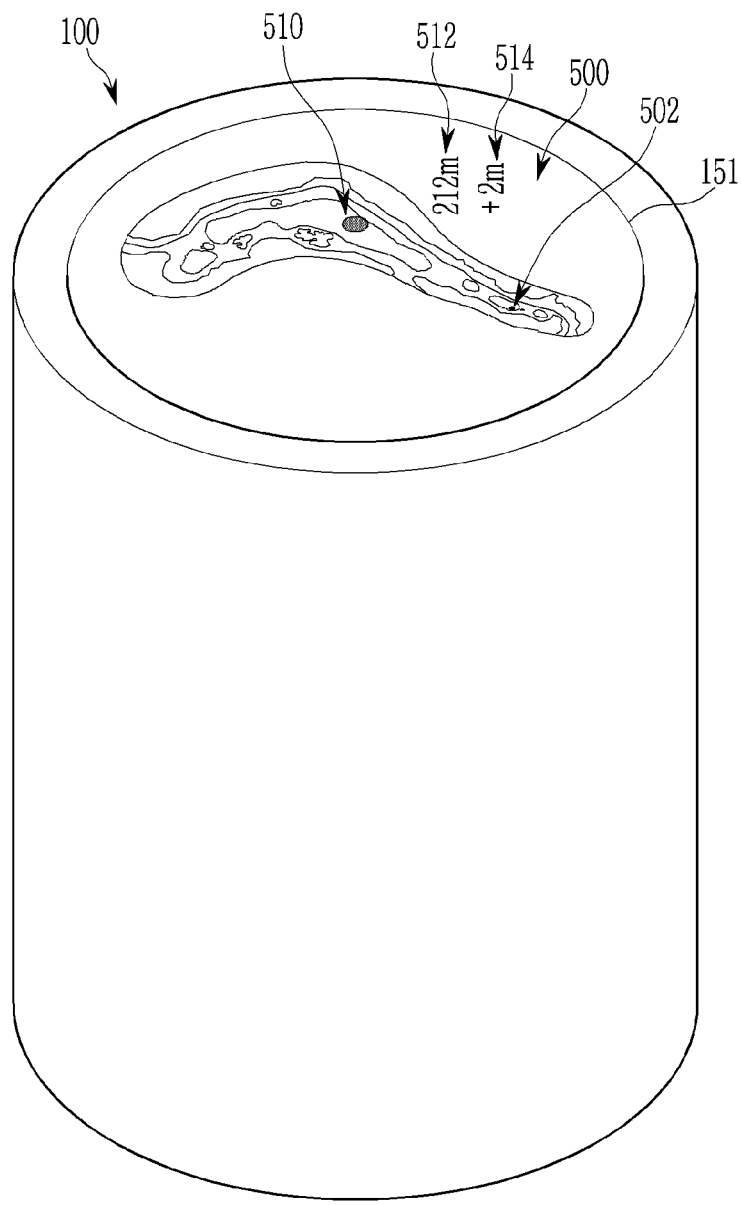
FIG. 5 is a view showing that a golf course is displayed on the electronic device according to an exemplary embodiment.

FIG. 5 is a view showing that a golf course is displayed on the electronic device according to an exemplary embodiment.

As shown in the drawing, the control unit 180 may control the display unit 151 to display an indicator 502 corresponding to the current position and an indicator 510 corresponding to the falling point of the golf ball on map information 500 of the corresponding golf course. In addition, the control unit 180 may control the display unit 151 to display information on a distance 512 based on the displacement D3 and an altitude difference 514 between the falling point of the golf ball and the current position of the electronic device 100. In addition, the control unit 180 may control the display unit 151 to display the trajectory of the golf ball between the point where the electronic device 100 is positioned and the falling point of the ball.

The control unit 180 may control the display unit 151 to display the images of the golfer and the golf ball, captured for the predetermined time before and after the moment the golf ball is hit. In addition, the control unit 180 may control the movement trajectory and falling point of the golf ball in the image to be detected, and control the display unit 151 to display the detected image together with the images of the golfer and golf ball.

Meanwhile, the electronic device 100 may communicate with the external electronic device through the wireless communication unit 170 to transmit information on the falling point or information used to calculate the falling point.

Figure 6:
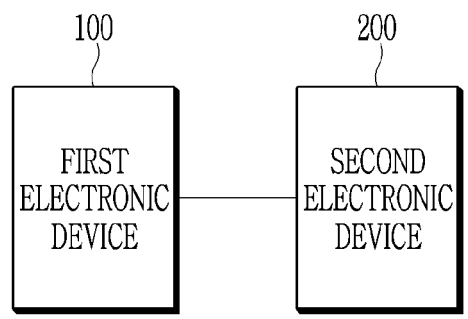
FIG. 6 is a block diagram showing a system guiding the falling point according to an exemplary embodiment.
Figure 7:
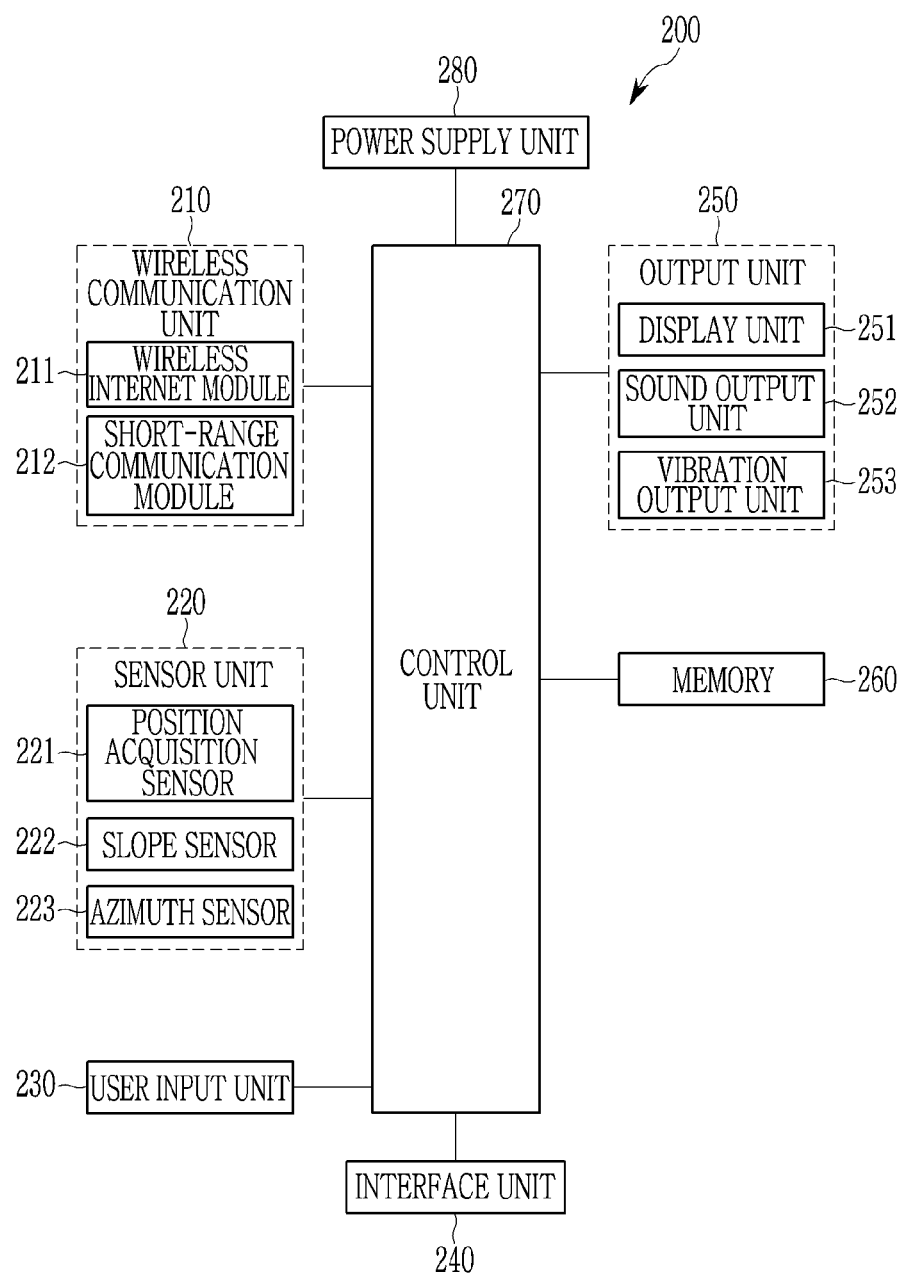
FIG. 7 is a block diagram for explaining an external electronic device according to an exemplary embodiment.
Figure 8:
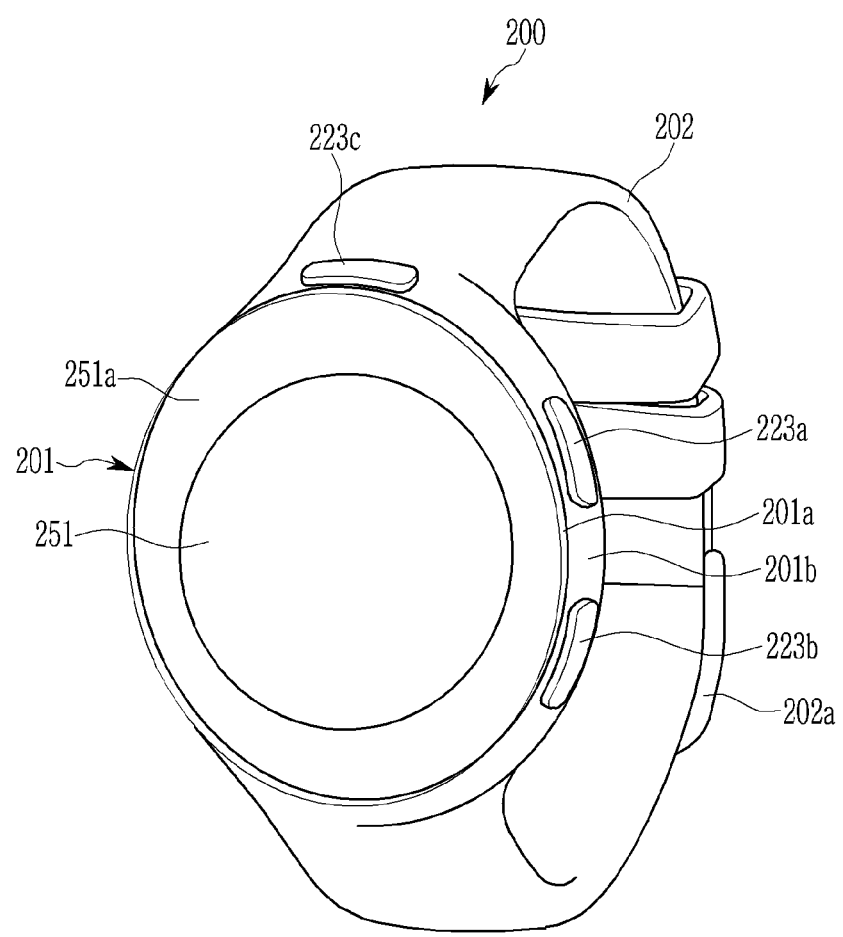
FIG. 8 is a schematic view of an electronic device according to an exemplary embodiment.

FIG. 6 is a block diagram showing a system guiding the falling point according to an exemplary embodiment; FIG. 7 is a block diagram for explaining an external electronic device according to an exemplary embodiment; and FIG. 8 is a schematic view of an electronic device according to an exemplary embodiment.

As shown in FIG. 6, the electronic device 100 may communicate with an external electronic device 200 through short range communication such as bluetooth. An application program may be installed in the external electronic device 200 to receive the data from the electronic device 100, calculate the falling point, and display the falling point together with the map information.

Referring to FIG. 7, the electronic device 200 may include a wireless communication unit 210, a sensor unit 220, a user input unit 230, an interface unit 240, an output unit 250, a memory 260, a control unit 270, a power supply unit 280, etc. The components shown in FIG. 7 may not be essential in implementing the electronic device 200, and the electronic device 200 described in the specification may include more or fewer components than the components listed above.

In more detail, the wireless communication unit 210 among the components may include at least one module enabling a wireless communication between the electronic device 200 and a wireless communication system, between the electronic device 200 and other wireless communication enabled electronic devices, or between the electronic device 200 and an external server.

The wireless communication unit 210 may include a wireless internet module 211, a short-range communication module 212, etc.

The wireless internet module 211 may be a module for wireless internet access, and may be embedded in the electronic device 100. The wireless internet module 211 may transmit and receive a wireless signal in a communication network based on wireless internet technology. The wireless internet technology may be, for example, wireless local area network (WLAN), wireless-fidelity (Wi-Fi), Wi-Fi direct, a digital living network alliance (DLNA), wireless broadband (WiBro), world Interoperability for microwave access (WiMAX), high speed downlink packet access (HSDPA), high speed uplink packet access (HSUPA), long term evolution (LTE), long term evolution-advanced (LTE-A), etc. The wireless internet module 171 may transmit and receive the data based on at least one wireless internet technology in its range even including internet technology not listed above.

The short-range communication module 212 may be a module for short range communication, and may support the short range communication using at least one of technologies of bluetooth, radio frequency identification (RFID), infrared data association (IrDA), ultra wideband (UWB), zigbee, near field communication (NFC), wireless-fidelity (Wi-Fi), Wi-Fi direct and wireless universal serial bus (USB). The short-range communication module 212 may support the wireless communication between the electronic device 200 and the wireless communication system, between the electronic device 200 and a wireless communication enabled device, or between the electronic device 200 and a network where the external server is positioned, through the wireless local area network. The wireless local area network may be a wireless personal area network.

Here, the wireless communication enabled device may be a mobile terminal capable of exchanging (or interworking) data with the electronic device 200 according to the present disclosure (for example, smartphone, tablet personal computer (PC) or laptop personal computer (PC)). The short-range communication module 212 may detect (or identify) the wireless communication enabled device which may communicate with the electronic device 200 in the vicinity of the electronic device 200. Further, the control unit 270 may control at least some of data processed by the electronic device 200 to be transmitted to the wireless communication enabled device through the short-range communication module 212 when the detected wireless communication enabled device is a device authenticated to communicate with the electronic device 200 according to an exemplary embodiment. Accordingly, a user of the wireless communication enabled device may use the data processed by the electronic device 200 through the wireless communication enabled device.

The sensor unit 220 may include at least one sensor detecting at least one of information on an environment surrounding the electronic device 200 and information in the electronic device 200. For example, the sensor unit 220 may include at least one of a position acquisition sensor 221, an acceleration sensor 222, an azimuth sensor 223, a gyroscope sensor, a battery gauge, and an environmental sensor (e.g., barometer, hygrometer or temperature gauge). Meanwhile, the electronic device 200 disclosed in the specification may combine the information detected by at least two of these sensors to each other and utilize the combined information.

First, the position acquisition sensor 221 may be a sensor acquiring the position of the electronic device 200, and its representative example is a global positioning system (GPS) sensor. The GPS sensor may calculate the distance information and accurate time information of the electronic device 200 from three (3) or more satellites and then apply trigonometry to the calculated information, thereby accurately calculating information on a three dimensional (3D) current position of the electronic device 200 based on the latitude, longitude and altitude thereof. In current days, widely used is a method in which the position and time information of the device are calculated using three satellites and an error in the calculated position and time information is then corrected using another satellite. In addition, the GPS sensor may calculate speed information of the device by continuously calculating its current position in real time.

The slope sensor 222 may acquire a slope (tilt) degree of the electronic device 200. The slope sensor 222 may include an acceleration sensor (accelerometer) measuring acceleration of gravity. In addition, the slope sensor 222 may calculate the slope or the like using a rotation angle in the vertical direction from a predetermined reference direction, acquired by a gyro sensor.

The azimuth sensor 223 may be a sensor measuring the azimuth, and may acquire a value of the azimuth that the electronic device 200 faces. The azimuth sensor 223 may be a geomagnetic sensor detecting the earth's magnetic field and measuring the azimuth. In addition, the azimuth sensor 223 may calculate the azimuth or the like using the rotation angle in the left and right directions from the predetermined reference direction, acquired by the gyro sensor.

Next, the user input unit 230 may be a unit receiving information from the user, and when the information is input through the user input unit 230, the control unit 270 may control an operation of the electronic device 200 to correspond to the input information. The user input unit 230 may include a mechanical input means (or mechanical key, e.g., button positioned on the front, back or side of the electronic device 200, or the bezel, crown, dome switch, jog wheel, jog switch or the like of the electronic device 200) and a touch input means. For example, the touch input means may be a virtual key, a soft key or a visual key, displayed on a touch screen by a software processing, or a touch key disposed on a portion other than the touch screen. Meanwhile, the virtual key or the visual key may have various shapes and may be displayed on the touch screen, and for example, may be a graphic, a text, an icon, a video or a combination thereof.

The interface unit 240 may serve as a passage to various types of external devices connected to the electronic device 200. The interface unit 240 may include at least one of an external charger port, a wired/wireless data port and a memory card port. The electronic device 200 may perform an appropriate control related to the connected external device, corresponding to the external device connected to the interface unit 240.

The output unit 250 may be a unit generating an output related to visual, auditory or tactile sense, and may include a display unit 251, a sound output unit 252, a vibration output unit 253, etc.

The display unit 251 may display (output) information processed by the electronic device 200. For example, the display unit 251 may display information on a execution screen of an application program driven by the electronic device 200, or user interface (UI) information or graphic user interface (GUI) information based on the information on the execution screen. The two or more display units 251 may be implemented based on an implementation type of the electronic device 200.

The display unit 251 may include at least one of a liquid crystal display (LCD), a thin film transistor-liquid crystal display (TFT LCD), an organic light-emitting diode (OLED) and an electronic ink display (e-ink display).

The sound output unit 252 may output audio data stored in the memory 260 as sound, and may be implemented in the form of a loudspeaker outputting various alarm sounds or multimedia playback sounds.

The vibration output unit 253 may generate various tactile effects that the user may sense. The intensity and pattern of vibration generated by the vibration output unit 253 may be controlled by a user selection or a setting of the control unit 270. For example, the vibration output unit 253 may synthesize and output different vibrations or sequentially output the different vibrations.

In addition, the output unit 250 may further include a light output unit outputting a signal notifying an occurrence of an event by using light as a light source.

In addition, the memory 260 may store data supporting various function of the electronic device 200 (e.g., data may include the information on the course map of the tee box, fairway, hazard, bunker, rough, green and hole of the golf course, and the data is not limited thereto). The memory 260 may store firmware and application program driven by the electronic device 200, and data and instruction words for the operation of the electronic device 200. At least some of these applications may be included in the electronic device 200 from time of shipment for operating a basic function of the electronic device 200. In addition, at least some of these application programs may be downloaded from the external server through the wireless communication. Meanwhile, the application program may be stored in the memory 260, installed in the electronic device 200, and may be d riven to perform the operation (or function) of the electronic device 200 by the control unit 270.

In addition to the operation related to the application program, the control unit 270 may control overall operations of the electronic device 200. The control unit 270 may provide or process appropriate information or function to the user by processing the signal, data, information or the like input or output through the component described above or by driving the application program stored in the memory 260.

In addition, the control unit 270 may control at least some of the components described with reference to FIG. 7 to drive the application program stored in the memory 260. Further, the control unit 270 may combine at least two of the components included in the electronic device 200 with each other and operate these combined components to drive the application program.

The power supply unit 280 may supply power to the respective components included in the electronic device 200 by receiving external power and internal power, under a control of the control unit 270. The power supply unit 280 may include a battery, and the battery may be a built-in battery or a replaceable battery.

At least some of the respective components may be operated in cooperation with each other to implement the operation, control or control method of the electronic device 200 according to the various exemplary embodiments described below. In addition, the operation, control or control method of the electronic device 200 may be implemented in the electronic device 200 by driving at least one application program stored in the memory 260.

The electronic device 200 may be implemented in various types such as a watch type, a clip type, a glass type, or a slide type in which two or more bodies are coupled to each other to be moved relatively to each other, a swing type, a swivel type, etc. A specific type of the electronic device 200 or any description related to the specific type of the electronic device 200 may be generally applied to other types of the electronic device 200.

Referring to FIG. 8, the electronic device 200 may include a main body 201 having the display unit 251 and a band 202 configured to be connected to the main body 201 to be worn on a user wrist.

The main body 201 may include a case forming its appearance. As shown in the drawing, the case may include a first case 201*a* and a second case 201*b*, each providing an internal space accommodating various electronic components. However, the present disclosure is not limited thereto, and may have one case providing the internal space, thereby implementing the unibody electronic device 200.

The electronic device 200 may be configured to perform the wireless communication, and an antenna for the wireless communication may be installed in the main body 201. Meanwhile, the antenna may extend its performance using the case. For example, the case including a conductive material may be electrically connected to the antenna to expand a ground area or a radiation area.

The display unit 251 may be disposed on the front of the main body 201 and output information. As shown in the drawing, a window 251*a* of the display unit 251 may be mounted on the first case 201*a* and form the front of a terminal body together with the first case 201*a*.

In addition, the display unit 251 may include a touch sensor and may be implemented as the touch screen. Hereinafter, the description is made on the assumption that the display unit 251 is the touch screen.

The main body 201 may include user input units 223*a*, 123*b* and 123*c*, the sound output unit (not shown), a microphone (not shown), etc. When implemented as the touch screen, the display unit 251 may function as the user input unit 223, and accordingly, the main body 201 may not include any separate key.

The band 202 may be worn on the user wrist to surround the wrist, and may be made of a flexible material to be easily worn by the user. For example, the band 202 may be made of leather, rubber, silicone or synthetic resin material. In addition, the band 202 may be configured to be detachable from the main body 201, and to be replaced with a band of various types based on a user taste.

Meanwhile, the band 202 may be used to extend the performance of the antenna. For example, the band may have a ground extension unit (not shown) electrically connected to the antenna and expanding the ground area.

The band 202 may include a fastener 202*a*. The fastener 202*a* may be implemented as a buckle, a snap-fit hook structure, or Velcro (trade name) or the like, and may include a section or material having elasticity. The drawing shows an example in which the fastener 202*a* is implemented in the form of a buckle.

The electronic device 200 as described above may receive the information on the initial physical quantity of the hit golf ball, the azimuth and the distance between the golf ball and the electronic device 100 from the electronic device 100. The control unit 270 may then calculate the trajectory TR of the golf ball by using the initial physical quantity, may calculate the falling point of the golf ball by using the azimuth, the distance between the golf ball and the electronic device 100 and the trajectory TR of the golf ball, and may then calculate the displacement D3 of the golf ball to the falling point. The position acquisition sensor 221 may acquire the current position of the electronic device 200, and calculate the falling point of the golf ball on the information on the corresponding golf course map in consideration of the current position and the displacement D3. The control unit 270 may control the falling point of the golf ball to be displayed on the map information.

Alternatively, the electronic device 200 may receive the information on the azimuth, the distance between the golf ball and the electronic device 100 and the trajectory TR of the golf ball from the electronic device 100. The control unit 270 may then calculate the falling point of the golf ball by using the azimuth, the distance between the golf ball and the electronic device 100 and the trajectory TR of golf ball, and may then calculate the displacement D3 of the golf ball to the falling point. The position acquisition sensor 221 may acquire the current position of the electronic device 200, and calculate the falling point of the golf ball on the information on the corresponding golf course map in consideration of the current position and the displacement D3. The control unit 270 may control the falling point of the golf ball to be displayed on the map information.

Alternatively, the electronic device 200 may receive the information on the displacement D3 from the electronic device 100. The position acquisition sensor 221 may then acquire the current position of the electronic device 200, and calculate the falling point of the golf ball on the information on the corresponding golf course map in consideration of the current position and the displacement D3. The control unit 270 may control the falling point of the golf ball to be displayed on the map information.

Alternatively, the electronic device 200 may receive the information on the falling point of the golf ball from the electronic device 100. The control unit 270 may then control the falling point of the golf ball to be displayed on the map information.

Figure 9:
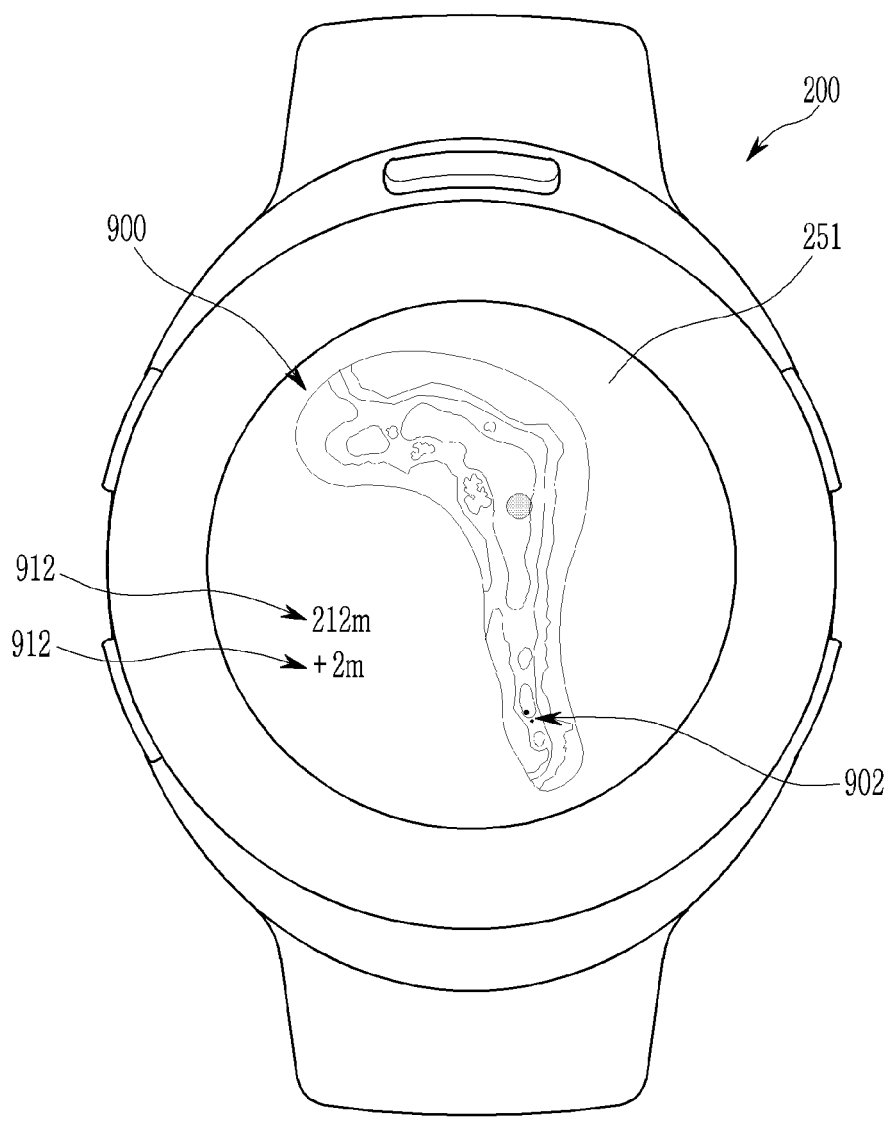
FIG. 9 is a view showing that a golf course is displayed on the external electronic device according to an exemplary embodiment.

FIG. 9 is a view showing that a golf course is displayed on the external electronic device according to an exemplary embodiment.

As shown in the drawing, the control unit 270 may control the display unit 251 to display an indicator 902 corresponding to the current position of the device 200 and an indicator 910 corresponding to the falling point of the golf ball on map information 900 of the corresponding golf course. The control unit 270 may control the display unit 251 to further display the distance between the current position of the electronic device 200 and the falling point. In this way, the golfer wearing the electronic device 200 may check a positional relationship between the current position of the device and the falling point of the ball and a remaining distance therebetween.

In addition, the control unit 270 may control the display unit 251 to display information on a distance 912 based on the displacement D3 of the ball and an altitude difference 914 between the falling point of the golf ball and the current position of the electronic device 200. In addition, the control unit 270 may control the display unit 251 to display the trajectory of the ball between the point where the electronic device 100 is positioned and the falling point of the golf ball.

Figure 10:
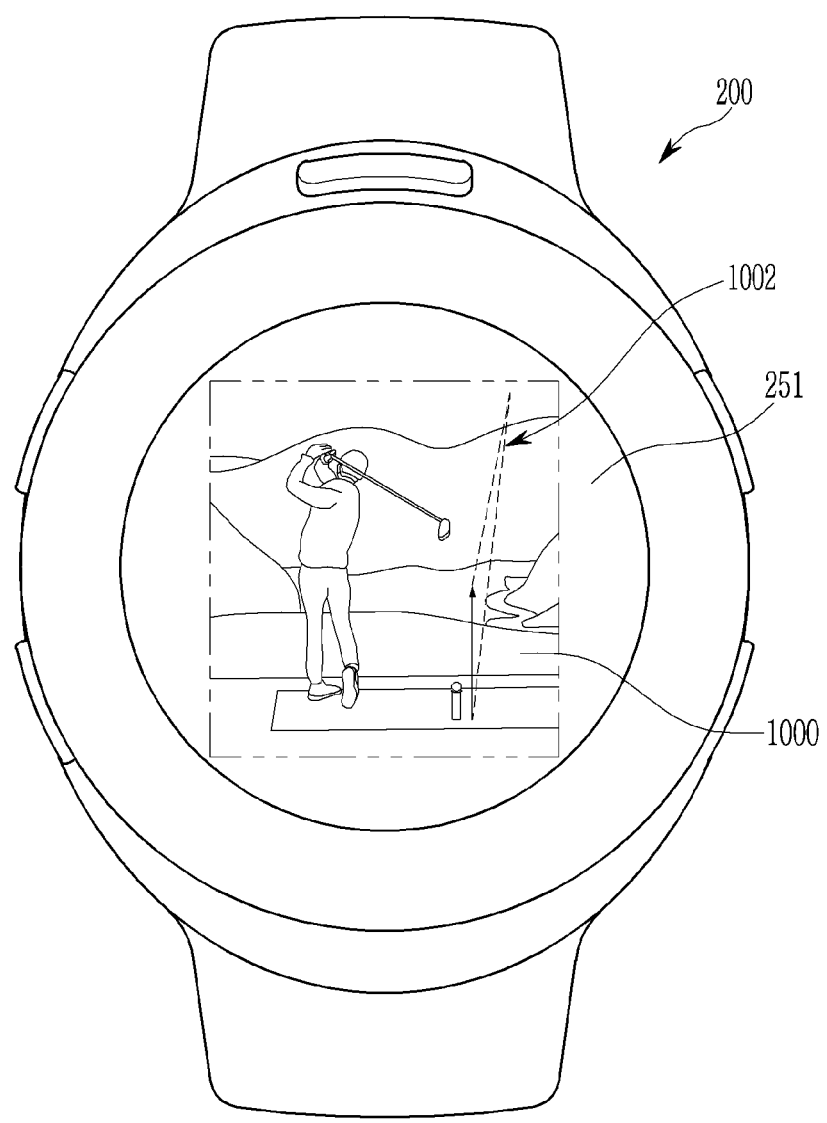
FIG. 10 is a view showing that a trajectory of a ball is displayed on the external electronic device.
Figure 11:
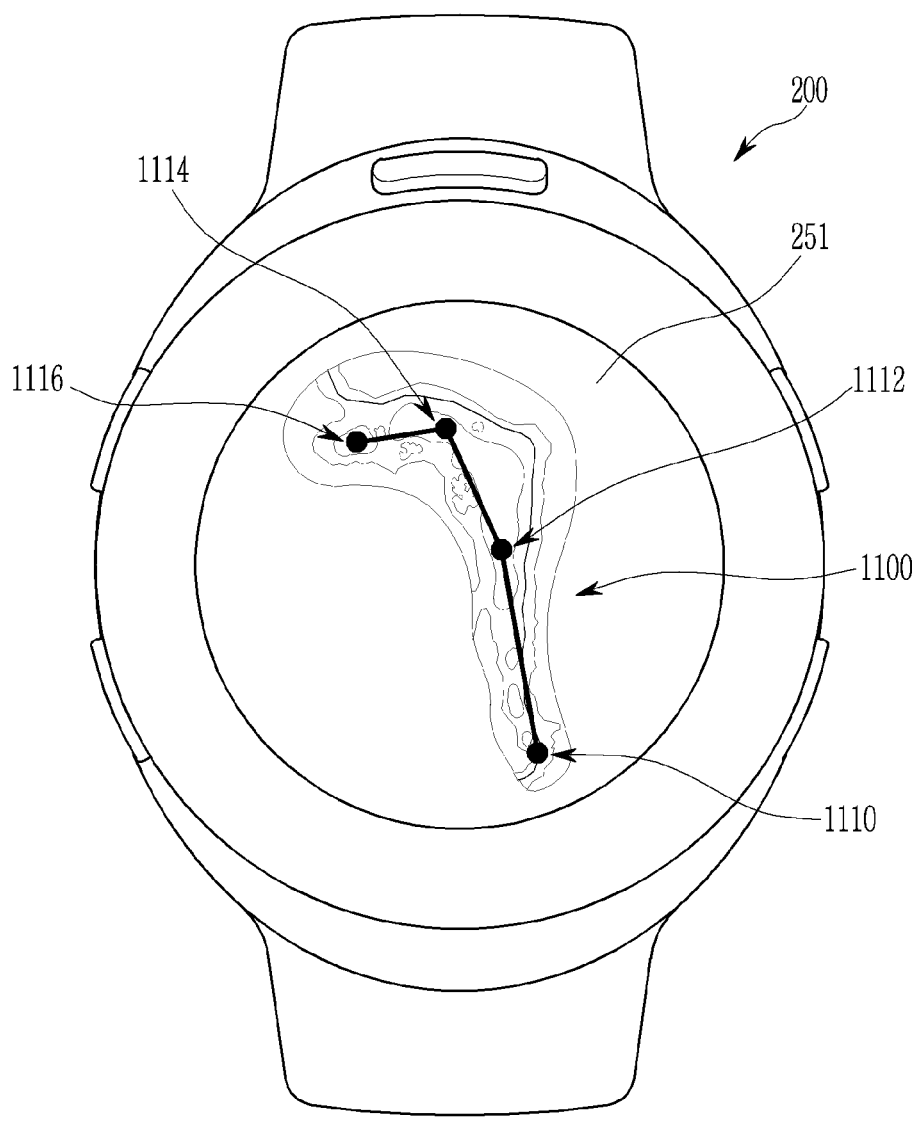
FIG. 11 is a view showing that information on a golf round is displayed on the external electronic device.

FIG. 10 is a view showing that a trajectory of a ball is displayed on the external electronic device; and FIG. 11 is a view showing that information on a golf round is displayed on the external electronic device.

Referring to FIG. 10, the control unit 180 may combine the captured images of the golfer and the golf ball for a predetermined time before and after a moment when the golf ball is hit and the movement trajectory and falling point of the golf ball detected in the image with the corresponding image, and may then control the combined image to be transmitted to the electronic device 200. Upon receiving this combined image, the electronic device 200 may display an image 1000 in which a movement trajectory 1002 and the like are displayed on the display unit 251.

Referring to FIG. 11, the control unit 180 may control the information to be transmitted to the electronic device 200, the information being on the determined falling points of the golf ball and the information on the trajectories between the falling points of the golf ball and the point where the electronic device 100 is positioned, on the information on the corresponding golf course map. The electronic device 200 may then display map information 1100 on the display unit 251, the map information 1100 showing an initial point 1110 where the electronic device 100 is positioned and falling points 1112, 1114 and 1116 of the golf ball on the corresponding golf course.

In addition, the electronic device 100 may match the falling points 1112, 1114 and 1116 of the golf ball predicted by the radar unit 110 or the camera 122, and the points where the electronic device 100 are positioned to measure the golf ball, thereby correcting the positions of the predicted falling points 1112, 1114 and 1116.

For example, when the falling point of the golf ball predicted in a first shot and the point where the electronic device 100 is positioned to measure a second shot are spaced apart from each other by a predetermined distance or more, the falling point of the golf ball predicted in the first shot may be corrected to the point where the electronic device 100 is positioned to measure the second shot.

The electronic device 100 guiding a falling point of a ball according to an exemplary embodiment and the system including the same may more accurately guide the trajectory and falling point of the ball to the user even during a golf game.

Although the exemplary embodiments of the present disclosure have been described in detail hereinabove, the scope of the present disclosure is not limited thereto. Various modifications and improvements made by those skilled in the art to which the present disclosure pertains also belong to the scope of the present disclosure.

The invention claimed is:

1. An electronic device comprising:
 a trajectory calculation unit measuring an initial physical quantity of a hit ball and calculating a trajectory of the ball by using the initial physical quantity;
 an azimuth sensor measuring a first azimuth corresponding to a direction that the trajectory calculation unit faces;
 a control unit calculating a displacement of the ball by using the first azimuth and the trajectory of the ball;
 a memory storing information on a golf course map; and
 a position acquisition sensor acquiring a current position,
 wherein the control unit calculates a falling point of the ball in a golf course, corresponding to the current position, by using the map information, the current position, and the displacement of the ball.

2. The electronic device of claim 1, further comprising a communication unit, wherein
 the control unit controls information on the falling point to an external electronic device to be transmitted by the communication unit for an indicator indicating the falling point on the golf course map to be displayed on a display unit of the external electronic device.

3. The electronic device of claim 1, further comprising a display unit, wherein the control unit controls an indicator indicating the falling point on the golf course map to be displayed on the display unit.

4. The electronic device of claim 1, wherein
 the trajectory calculation unit includes a Doppler radar sensor measuring the velocity and spin of the ball.

5. The electronic device of claim 1, wherein
 the trajectory calculation unit includes a camera calculating the velocity and spin of the ball by using successively captured image frames.

6. A system comprising:
 the electronic device of claim 1; and
 a wearable electronic device displaying an indicator indicating a falling point of a hit ball on a golf course map on a display unit by receiving information on the falling point of the ball, transmitted from the electronic device, an initial physical quantity of the hit ball and a first azimuth, or the first azimuth and a trajectory of the ball.

7. An electronic device comprising:
 a communication unit;
 a hit ball measurement unit measuring an initial physical quantity of a hit ball;
 an azimuth sensor measuring a first azimuth corresponding to a direction that the hit ball measurement unit faces; and a control unit controlling information on the initial physical quantity of the hit ball and the first azimuth to be transmitted to an external electronic device by the communication unit for the external electronic device to calculate a trajectory of the ball by using the initial physical quantity, to calculate a displacement of the ball by using the first azimuth and the trajectory of the ball, and to calculate a falling point of the ball in a golf course, corresponding to a current position of the external electronic device, by using information on a golf course map, the current position, and the displacement of the ball.

8. The electronic device of claim 7, wherein
the hit ball measurement unit includes a Doppler radar sensor measuring the velocity and spin of the ball.

9. The electronic device of claim 7, wherein
the hit ball measurement unit includes a camera calculating the velocity and spin of the ball by using successively captured image frames.

10. An electronic device comprising:
a communication unit;
a trajectory calculation unit measuring an initial physical quantity of a hit ball and calculating a trajectory of the ball by using the initial physical quantity;
an azimuth sensor measuring a first azimuth corresponding to a direction that the trajectory calculation unit faces; and
a control unit controlling information on the first azimuth and the trajectory of the ball to be transmitted to an external electronic device by the communication unit for the external electronic device to calculate a displacement of the ball by using the first azimuth and the trajectory of the ball, and to calculate a falling point of the ball in a golf course, corresponding to a current position of the external electronic device, by using information on a golf course map, the current position, and the displacement of the ball.

11. The electronic device of claim 10, wherein the trajectory calculation unit includes a Doppler radar sensor measuring the velocity and spin of the ball.

12. The electronic device of claim 10, wherein the trajectory calculation unit includes a camera calculating the velocity and spin of the ball by using successively captured image frames.

\* \* \* \* \*